United States Patent [19]

Cheng

[11] Patent Number: 5,080,704
[45] Date of Patent: Jan. 14, 1992

[54] SOLID-LIQUID-VAPOR MULTIPLE PHASE TRANSFORMATION PROCESS WITH COUPLED ABSORPTION-MELTING OPERATIONS

[76] Inventor: Chen-Yen Cheng, 9605 La Playa St. NE., Albuquerque, N. Mex. 87111

[21] Appl. No.: 486,081

[22] Filed: Feb. 27, 1990

[51] Int. Cl.$^5$ .............................................. B01D 9/04
[52] U.S. Cl. ........................................ 62/532; 62/123
[58] Field of Search ................... 62/12, 532, 542, 123

[56] References Cited

U.S. PATENT DOCUMENTS

| | | | |
|---|---|---|---|
| 4,378,984 | 4/1983 | Cheng et al. | 62/12 |
| 4,451,273 | 5/1984 | Cheng et al. | 62/12 |
| 4,489,571 | 12/1984 | Cheng et al. | 62/542 |
| 4,505,728 | 3/1985 | Cheng et al. | 62/542 |
| 4,578,093 | 3/1986 | Cheng et al. | 62/12 |
| 4,810,274 | 3/1989 | Cheng et al. | 62/12 |

*Primary Examiner*—Ronald C. Capossela

[57] ABSTRACT

A Multiple Phase Transformation Absorption Melting Process (MPTAM Process) comprises a step of subjecting a feed solution to a simultaneous vaporization and freezing operation, denoted as multiple phase transformation operation, to thereby form a first vapor, $V_{13}$, and a solid-liquid mixture, $K_{16}$, and is characterized in absorbing the first vapor into an absorbing solution of a moderate concentration to thereby elevate the absorbing temperature so that the heat released can be used to melt a mass of solvent solid. For the heat coupling to work, the absorbing solution is formulated by using a properly selected solute and is within a proper concentration range such that, while the absorbing pressure is near or slightly lower than the pressure of the freezing operation, the absorbing temperature is somewhat higher than the melting temperature of the solvent solid. In a Type A MPTAM process, the heat released in the absorption operation is used to generate a second vapor and the second vapor is used to melt the solvent solid; in the Type B MPTAM process, the heat released in the absorption operation is transferred through a heat conducting conduit to melt the solvent solid. Apparatuses that can be used to conduct both a Type A process and a Type B process have also been introduced.

13 Claims, 5 Drawing Sheets

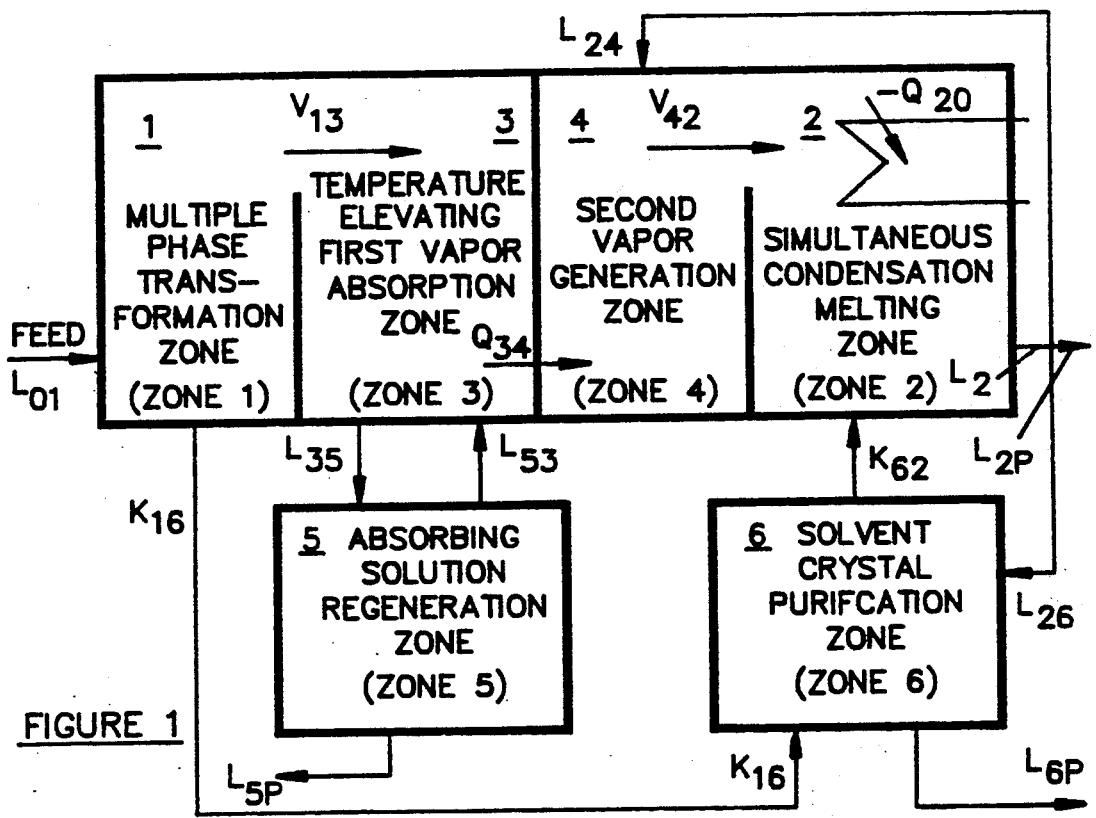

FIGURE 1

STEP 1: MULTIPLE PHASE TRANSFORMATION
$$L_{01} \longrightarrow V_{13} + K_{16}$$

STEP 2: SIMULTANEOUS CONDENSATION-MELTING
$$V_{42} + K_{62} \longrightarrow L_2$$

STEP 3: TEMPERATURE ELEVATING FIRST VAPOR ABSORPTION
$$V_{13} + L_{53} \xrightarrow[-Q]{} L_{35}$$

STEP 4: SECOND VAPOR GENERATION
$$L_{24} \xrightarrow[+Q]{} V_{42}$$

STEP 5: ABSORBING SOLUTION REGENERATION
$$L_{35} \longrightarrow L_{53} + L_{5P}$$

STEP 6: CRYSTAL PURIFICATION
$$K_{16} + L_{26} \longrightarrow K_{62} + L_{6P}$$

STEP 7: SOLVENT RECYCLING
$$L_2 \longrightarrow L_{24} + L_{26} + L_{2P}$$

STEP 8: AUXILIARY COOLING

FIGURE 2

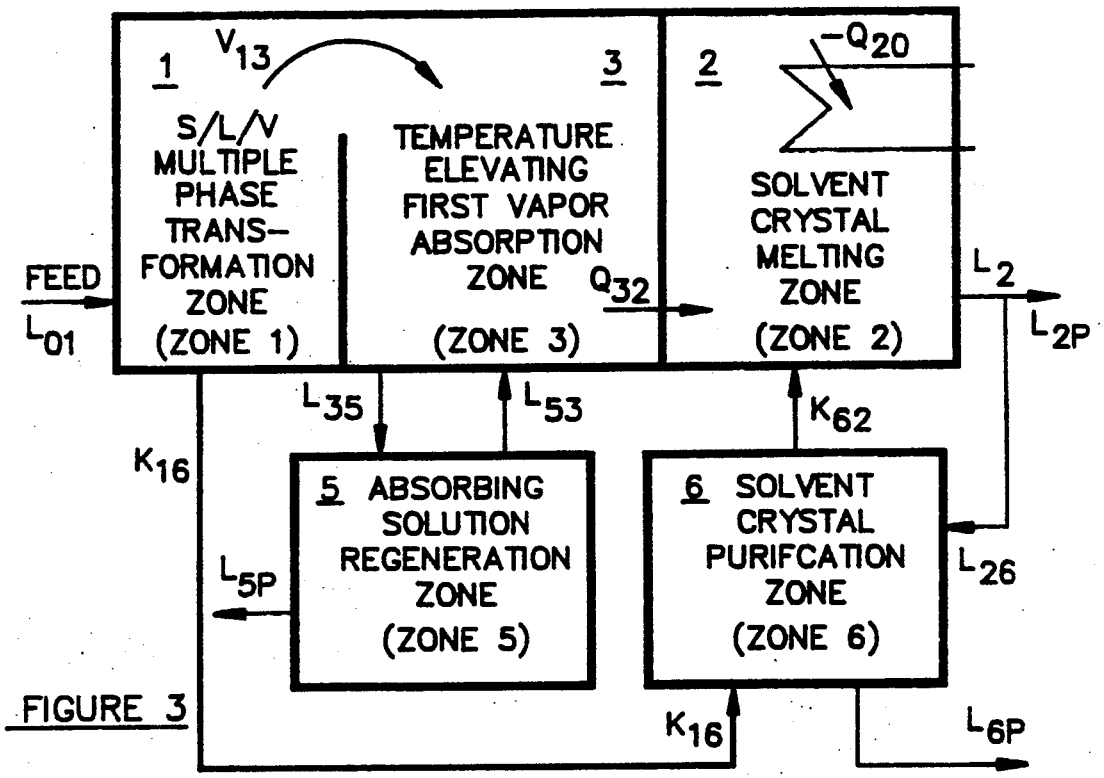

FIGURE 3

STEP 1: MULTIPLE PHASE TRANSFORMATION $$L_{01} \longrightarrow V_{13} + K_{16}$$

STEP 2: SOLVENT CRYSTAL MELTING $$K_{62} \xrightarrow{+Q} L_2$$

STEP 3: TEMPERATURE ELEVATING FIRST VAPOR ABSORPTION $$V_{13} + L_{53} \xrightarrow{-Q} L_{35}$$

STEP 4: ABSORBING SOLUTION REGENERATION $$L_{35} \longrightarrow L_{53} + L_{5P}$$

STEP 5: SOLVENT CRYSTAL PURIFICATION $$K_{16} + L_{26} \longrightarrow K_{62} + L_{6P}$$

STEP 6: SOLVENT RECYCLING $$L_2 \longrightarrow L_{26} + L_{2P}$$

STEP 7: AUXILIARY COOLING

FIGURE 4

SOLID-LIQUID-VAPOR MULTIPLE PHASE TRANSFORMATION PROCESS WITH COUPLED ABSORPTION-MELTING OPERATIONS

BACKGROUND OF THE INVENTION

1. Field of Invention

The present invention is related to methods and apparatuses for conducting solid-liquid-vapor (S/L/V) multiple phase transformation processes such as vacuum freezing processes, primary refrigerant eutetic freezing processes and distillative freezing processes. An S/L/V multiple phase transformation refers to simultaneous vaporization and solidification operations by which a mass of liquid is simultaneously partially vaporized and partially solidified to thereby form a first vapor and a mass of solvent solid. The processes of the present invention are to be used in chemical purification, desalination, pollution abatement, and concentration of industrial solutions.

2. Brief Description of the Prior Art

The methods and apparatuses of the present invention are to be used in conducting solid-liquid-vapor multiple phase transformation operations (S/L/V Transformation) in (a) Vacuum Freezing Processes, (b) Primary Refrigerant Eutectic Freezing Processes, and (c) Distillative Freezing Processes.

An S/L/V transformation refers to simultaneous vaporization and solidification operations of a mass of liquid to thereby form a first vapor and form a mass of solid which may be a mass of solvent crystals or a mixed mass of solvent and solute crystals. The present invention is particularly related to methods and apparatuses for handling the first vapor and melting the solvent crystals. Therefore, references to these processes are presented and conventional methods used in handling the first vapors are outlined.

Vacuum Freezing Processes

A vacuum freezing process can be used in the separation of both aqueous and non-aqueous solutions. Many vacuum freezing processes have been introduced by workers in the desalination field. Some of these processes have been tested in pilot plant scale operations.

Referring to the processing of an aqueous solution by any vacuum freezing process, the aqueous solution is introduced into a chamber which is maintained at a pressure that is somewhat lower than the vapor pressure of the solution at the freezing temperature of the solution to thereby simultaneously flash vaporize water and form ice crystals. This operation is referred to as the S/L/V transformation in a vacuum freezing process. As the result of this operation, a low pressure water vapor, referred to as a first vapor, and an ice-mother liquor slurry, referred to as a first condensed mass, are formed. In the case of sea water desalination, this pressure is around 3.5 Torr. The low pressure water vapor formed has to be removed and transformed into a condensed state; the ice crystals have to be separated from the mother liquor and the resulting purified ice has to be melted to yield fresh water. Furthermore, the heat released in transforming the vapor into a condensed state has to be utilized in supplying the heat needed in melting the ice. The processes to be described utilize different ways of vapor removal and different ways of accomplishing the heat reuse.

Several vacuum freezing processes have been introduced by workers in the desalination field. These processes are (1) Vacuum-Freezing Vapor-Compression (VFVC) Process, developed by Colt Industries, (2) Vacuum-Freezing Vapor-Absorption (VFVA) Process, developed by Carrier Corporation, (3) Vacuum-Freezing Ejector-Absorption (VFEA) Process, developed by Colt Industries, (4) Vacuum-Freezing Solid Condensation (VFSC) Process developed in the Catholic University of America, (5) Absorption Freezing Vapor Compression (AFVC) Process, introduced by Concentration Specialists, Inc., (6) Vacuum Freezing High Pressure Ice Melting (VFPIM), introduced by Chen-Yen Cheng and Sing-Wang Cheng, and (7) Vacuum Freezing Multiple Phase Transformation Process, also introduced by Chen-Yen Cheng and Sing-Wang Cheng.

The Vacuum Freezing Vapor Compression Process is described in the Office of Saline Water, Research and Development Report NO. 295. In the process, the low pressure water vapor is compressed to a pressure higher than the triple point pressure of water (4.58 Torr) and is then brought in direct contact with purified ice to thereby simultaneously condense the water vapor and melt the ice. The main disadvantages of this process are that the special compressor designed to compress the low pressure water vapor cannot be operated reliably, and the compressor efficiency is low.

The Vacuum Freezing Vapor Absorption Process was developed by Carrier Corporation up to 1964, but has been discontinued. The process is described in the Office of Saline Water, Research and Development Report No. 113. In the process, the low pressure water vapor is absorbed by a concentrated lithium bromide solution. The diluted solution is reconcentrated by evaporation and the water vapor so formed is condensed to become fresh water. Heat of absorption is removed by a recycling water stream through a heat transfer surface; the recycling water stream is then used to melt the ice crystals.

The Vacuum Freezing Ejector absorption Process was also developed by Colt Industries, and is described in Office of Saline Water, Research and Development Report No. 744. In the process, the low pressure water vapor obtained in the freezing step is compressed by a combination of steam ejector and absorber loop. A concentrated sodium hydroxide solution is used to absorb a part of the low pressure vapor; the diluted sodium hydroxide solution is boiled to form water vapor at 300 Torr, and is used to compress the remaining low pressure water vapor.

The Vacuum-Freezing Solid-Condensation Process was developed by Professors H. M. Curran and C. P. Howard of the Catholic University of America and is described in Office of Saline Water, Research and Development Report No. 511. In the process, Freon-12 is used to remove the latent heat released in transforming the low pressure vapor into ice and supply the latent heat needed in the melting of both the ice formed is the freezing step and ice transformed from the low pressure water vapor.

The Absorption Freezing Vapor Compression (AFVC) Process was introduced by Concentration Specialists, Inc. Andover, Mass. and a 25,000 gpd pilot plant has been built in OWRT (Office of Water Research and Technology) Wrightsville Beach Test Station. The absorption freezing vapor compression (AFVC) Process is a vacuum freezing process in which the freezing is accomplished in a stirred tank crystallizer due to the evaporation of water vapor which in turn is absorbed in an adjacent chamber by a concentrated solution of sodium chloride (NaCl). The NaCl solution, diluted by the water vapor, is pumped to a generator where it is concentrated to its original strength by a vapor compression cycle using a closed circuit refrigerant as the working fluid. The vapor compression cycle operated between the absorber and generator, taking the heat that is associated with absorption and pumping it up to a level such that it can be used to evaporate the absorbate in the generator. The vapor liberated in the generator is used to melt the ice in direct contact.

It is noted that the first vapor is absorbed in the absorbing solution near the freezing temperature, and the heat of absorption is removed by vaporizing a refrigerant.

In the improved Vacuum-Freezing High Pressure Ice Melting Process of U.S. Pat. No. 4,236,382, an aqueous solution is flash vaporized under a reduced pressure to simultaneously form a low pressure water vapor and ice crystals. The ice formed is first purified in a counter-washer and then melted inside of heat conductive conduits under a high pressure (e.g. 600 atm.), and the low pressure water vapor is desublimed to form desublimate (ice) on the outside of the conduits. The latent heat of desublimation released is utilized in supplying the heat needed in the ice-melting operation. The desublimate is removed intermittently by an insitu dissolution operation utilizing an aqueous solution such as the feed solution or the concentrate; about an equivalent amount of ice is formed inside of the conduits by an exchange freezing operation. The ice so formed is also melted by the high pressure ice melting operation described.

The Vacuum Freezing Multiple phase Transformation Process has also been introduced by Chen-Yen Cheng and Sing-Wang Cheng and is described in U.S. Pat. No. 4,505,728. In the process, the first vapor is liquefied by desublimation followed by desublimate melting operations.

The Primary Refrigerant Eutectic Freezing Processes

The Primary Refrigerant Eutectic Freezing (PREUF) Process has been introduced by Chen-Yen Cheng and Sing-Wang Cheng and is described in U.S. Pat. No. 4,654,064. The process is used to separate mixtures containing at least one volatile component and two or more crystalforming components. Heat is removed from a eutectic mixture at near its eutectic temperature by inducing vaporization of a portion of the eutectic mixture at its eutectic temperature. The vapor is liquefied by a two-step process: (a) desublimation, and (b) desublimate-melting. Co-crystallization of different components in the same zone of the freezer, or selective crystallization in different sub-zones of the freezer are possible.

Wet and Dry Distillative Freezing Process

Wet and Dry Distillative Freezing (DF) Process has been introduced by Chen-Yen Cheng and Sing-Wang Cheng and is described in U.S. Pat. No. 4,578,093. A wet and dry distillative freezing process comprises: (a) a first step of transforming a liquid feed mixture into a first solid-liquid mixture, denoted as $K_1$ mixture, and an impure liquid $L_2$, and (b) a second step of subjecting $K_2$ mixture, derived from $K_1$ mixture, to a dry distillative freezing operation to thereby form a mass of refined solid phase, denoted as $S_3$, and a low pressure vapor $V_1$. The low pressure vapor is liquefied by first condensing it into a solid-liquid mixture and then melting the solid so formed.

BRIEF DESCRIPTION OF THE INVENTION

A Multiple Phase Transformation Absorption Melting (MPTAM) Process of the present invention comprises a multiple phase transformation step in which a feed solution is subjected to a simultaneous vaporization and solvent crystallization operation to thereby form a first vapor, $V_{13}$, and a solid-liquid mixture, $K_{16}$ (denoted as a first condensed mass), and is characterized in coupling a temperature elevating first vapor absorption operation with a solvent solid melting operation. The absorbing solution used contains the solvent and a properly selected solute in a properly selected concentration range so that while the absorption pressure is near or slightly lower than that of the freezing operation, the absorbing temperature is somewhat higher than the melting temperature of the solvent solid.

In a Type A MPTAM Process, the heat released in the absorption step is first used to generate a mass of second vapor and the second vapor is brought in contact with the solvent solid to simultaneously condense the vapor and melt the solid. An integrated system to conduct a Type A MPTAM Process is introduced. In this system, the absorption and second vapor generation operations are conducted around two liquid films formed on the two sides of a heat conduction wall so that the heat of absorption on one side is transmitted through the wall and utilized in supplying the latent heat of vaporization of generating the second vapor.

In a Type B MPTAM Process, a slurry of solvent solid and liquid is passed through a heat conducting conduit and absorption takes place on the outer surface of the conduit so that the heat of absorption is transferred through the wall to thereby melt the solvent solid inside of the conduit.

The absorbing solution is diluted in the absorption operation and the diluted solution is concentrated back to the original concentration. Low grade heat sources, such as low pressure steam in power generation plant, particularly in co-generation plant, or various other sources, may be used to accomplish this operation.

BRIEF DESCRIPTION OF DRAWINGS

The present invention is related to methods and apparatuses for conducting a solid-liquid-vapor multiple phase transformation process with coupled vapor-absorption and crystal melting operations, denoted as MPTAM processes. There are Type A Processes and Type B Processes.

FIG. 1 illustrates a block diagram of a system to be used for conducting a Type A MPTAM Process. It shows that the system comprises a solid-liquid-vapor multiple phase transformation zone (Zone 1), a simultaneous vapor condensation crystal melting zone (Zone 2), a temperature elevating first vapor absorption zone (Zone 3), a second vapor generation zone (Zone 4), an absorbing solution regeneration zone (Zone 5), and a crystal washing zone (Zone 6). It also shows material flows between the zones.

FIG. 2 illustrated the processing steps of the Type A MPTAM Process that are conducted in the system of FIG. 1.

FIG. 3 illustrates a block diagram of a system to be used in conducting a Type B MPTAM Process. The system is similar to that of FIG. 1, except that the second vapor generation zone is eliminated and the temperature elevating first vapor absorption operation is directly heat coupled with melting of solvent solid.

FIG. 4 illustrates the processing steps of the Type B MPTAM Process that are conducted in the system of FIG. 3.

PREFERRED EMBODIMENT OF THE INVENTION

Figure 5:
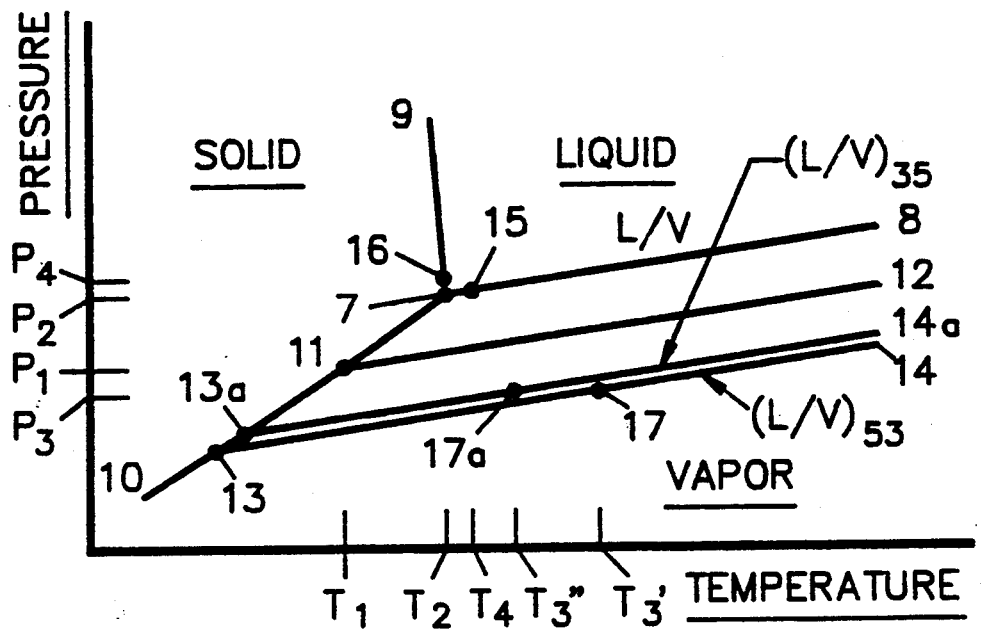
FIG. 5 illustrates a phase diagram of water and various aqueous solutions. It shows vapor pressure curves for water, aqueous solutions processed and absorbing solution used, and freezing temperatures of the solutions. The figure is used to illustrate the operating conditions of the processing steps in Type A and Type B MPTAM Processes.

The present invention relates to improved methods of conducting solid-liquid-vapor multiple phase transformation processes (denoted as S/L/V multiple phase process, or simply S/L/V processes) and apparatuses for use therein. An S/L/V multiple phase transformation process has a characteristic step of subjecting a mixture to a pressure that is lower than the vapor pressure of the solution at its freezing temperature to thereby simultaneously form a first vapor and a first condensed mass (slush) that contains a first mass of solvent crystals. This characteristic step is referred to in general as a multiple phase transformation step.

A liquid mixture processed may contain a solvent and one or more solutes which may be volatile or non-volatile. A process of the present invention may be called an improved vacuum freezing process, or an improved distillative freezing process, or an improved primary refrigerant eutectic freezing process, depending on the nature of the solution processed and the concentration range. Description of some vacuum freezing processes are given in U.S. Pat. Nos. 4,420,318, 4,505,728, and 4,810,274; description of some distillative freezing processes are given in U.S. Pat. Nos. 4,218,893, 4,433,558, 4,451,273, and 4,578,093; description of some primary refrigerant eutectic freezing process is given in U.S. Pat. No. 4,654,064.

The major objectives of the invention are (1) to reduce the energy consumption, (2) to simplify the apparatuses used, and (3) to make it possible to use low grade heat (such as waste heat to drive the processes). It is thus possible to reduce both the capital costs and operation costs of the processes. A process of the present invention is characterized in having a step of absorbing the first vapor formed in multiple phase transformation operation into an absorbing solution containing a properly selected solute within a proper concentration range such that while the absorption pressure is near or lower than the pressure of conducting the multiple phase transformation operation, the absorption temperature is somewhat higher than the melting temperature of a mass of solvent solid. The temperature of the absorption step is only that much higher than that of the melting step to provide the temperature differential needed for the heat transfer. This latent heat coupling may either be made through generation of a mass of second vapor or by heat transfer through a heat conduction wall. The present processes are referred to as the Multiple Phase Transformation Absorption Melting Process (MPTAM Process). The present processes are classified into Type A processes and Type B processes, depending on the ways the latent heat couplings are accomplished.

FIG. 1 shows a schematic illustration of a system in which a Type A MPTAM Process is conducted. The system comprises a multiple phase transformation zone (Zone 1), a simultaneous condensation-melting zone (Zone 2), a temperature elevating first vapor absorption zone (Zone 3), a second vapor generation zone (Zone 4), an absorbing solution regeneration zone (Zone 5), and crystal purification zone (Zone 6). FIG. 2 illustrates the processing steps involved. Referring to these two figures, the process comprises:

Step 1: Multiple Phase Transformation

A mass of liquid feed $L_{01}$ is introduced into the multiple phase transformation zone 1 that is maintained under a pressure lower than the vapor pressure of the solution in the zone at its freezing temperature to thereby form a first vapor, $V_{13}$, and a first condensed mass, $K_{16}$, containing a first mass of solvent crystals, $S_{16}$, and a mother liquor, $M_{16}$.

Step 2: Simultaneous Condensation-Melting

A second condensed mass (slush), $K_{62}$, containing a second mass of solvent crystals, $S_{62}$, is placed in Zone 2. A mass of second vapor, $V_{42}$, is brought into contact with the second condensed mass to melt the solvent crystals. The purified solvent liquid $L_2$ is divided into a product, $L_{2p}$, a mass $L_{24}$ recycled to step 4, and a mass $L_{26}$, recycled to step 6.

Step 3: Temperature Elevating First Vapor Absorption

The first vapor, $V_{13}$, is absorbed into a absorbing solution, $L_{53}$, in Zone 3 to form a diluted or weak absorbing solution, $L_{35}$. The absorbing solution in the zone contains a properly selected solute within a proper concentration range so that, while the absorption pressure is near or somewhat lower that the multiple phase transformation pressure in Zone 1, the absorption temperature is somewhat higher than the second vapor generation temperature of Step 4 to be described. The absorption solution $L_{53}$ is diluted by this absorption operation to become the diluted absorbing solution, $L_{35}$. The diluted absorbing solution is then concentrated back to the original concentration in Step 5 to be described.

Step 4: Second Vapor Generation

A mass of liquid, normally a mass of solvent, is vaporized in Zone 4 to form a mass of second vapor, $V_{42}$, whose condensing temperature is near or somewhat higher than the melting temperature of the second condensed mass in Zone 2. Zone 4 is separated from Zone 3 by heat conducting wall(s). Zone 3 and Zone 4 are in a heat exchange relation, and the heat of vaporization is provided by the heat released in the absorption step. The said step 2 is conducted by bringing the second vapor, $V_{42}$, into heat exchange relation with the second condensed mass in the second zone to thereby simultaneously condense the second vapor and melt the solvent crystals in the second condensed mass. The second vapor may be brought into a direct-contact heat exchange relation to accomplish the desired simultaneous condensation and crystal melting operations.

Step 5: Regeneration of the Absorbing Solution

The diluted absorbing solution, $L_{35}$, is concentrated in Zone 5 to produce a mass of enriched absorbing solution $L_{53}$ which is returned to Zone 3, and a mass of purified solvent $L_{5p}$. This concentration operation can be accomplished in many ways, such as (a) a single effect evaporation, (b) a multiple effect evaporation, (c) a single effect vapor compression evaporation, (d) a multiple effect vapor compression evaporation, (e) a freezing operation, etc. It is noted that low grade heat such as waste heat from various sources may be used to drive this concentration step. A mass of low pressure steam from a co-generation plant is a convenient heat source for this regeneration operation.

Step 6: Crystal Purifications

The first condensed mass, $K_{16}$, obtained in step 1, may be subjected to a crystal purification operation in Zone 6 using some purified solvent $L_{26}$ to produce a mass of concentrate $L_{6p}$ and a second condensed mass, $K_{62}$, which is subjected to the step 2 operation described.

Step 7: Solvent Recycling

A portion, $L_{24}$, of the mass of purified solvent $L_2$, produced in step 2, is recycled to step 4 in generating the second vapor; another portion, $L_{26}$, of the mass of purified solvent, is recycled to step 6 to wash solvent crystals; the rest becomes a mass of purified solvent product $L_{2p}$.

Step 8: Auxiliary Cooling

Due to heat leakages into the system and temperature differentials needed for heat exchange operations, there is a need for an auxiliary cooling operation. In other words, there is an excess second vapor that cannot be condensed by melting the mass of solvent crystals. The auxiliary cooling can be accomplished by condensing the excess second vapor.

FIG. 3 shows a schematic illustration of a system in which Type B MPTAM Process is conducted. The system comprises a multiple phase transformation zone (Zone 1), a solvent crystal melting zone (Zone 2), a temperature elevating first vapor absorption zone (Zone 3), an absorbing solution regeneration zone (Zone 5), and a solvent crystal purification zone (Zone 6). FIG. 4 illustrates the processing steps. As shown by these two figures, the processing steps in the Type B MPTAM Process are similar to the processing steps in the Type A MPFAM Process, with the following exceptions: (a) Second vapor is not generated (b) The latent heat of melting a mass of purified solvent crystals (step 2) is supplied by transferring heat from zone 3 to zone 2 though heat conducting walls. Therefore the latent heat released in the first vapor absorption step is utilized in supplying the latent heat needed in melting the solvent crystals.

FIG. 5 schematically illustrates the phase diagram of a solvent such as water and several solutions containing the solvent and some solutes. The figure also illustrates the operating condition during each of the steps of the present processes. It shows the triple print of the solvent 7, the vaporization line 7-8, the melting line 7-9, and the sublimation line 7-10. The solution being processed has a vaporization line, 11-12, and has the three (solid-liquid-vapor) phase equilibrium condition 11. The condition, $T_1$, $P_1$, prevailing in the multiple phase freezing operation is close to this condition. The vaporization curves of the enriched absorbing solution $L_{53}$ and the diluted absorbing solution $L_{35}$ are respectively shown as lines 13-14 and 13a-14a. The condition $T_4$, $P_4$ under which the second vapor is generated is represented by point 15 and condition $T_2$, $P_2$ under which the mass of solvent crystals is melted is represented by point 16. It is seen that the solute used and the concentration range used in the absorbing solution are such that the absorption pressure, $P_3$, is near or somewhat lower than the pressure $P_1$ of the multiple phase transformation operation and the absorbing temperature is in the range of $T_{3'}$ and $T_{3''}$, 17 and 17a. Referring to processing of an aqueous solution, the triple point is at around 0 degrees Centigrade and 4.58 torr, the solution being processed may contain up to 15% solute, the absorbing solution used may contain aluminum chloride, calcium chloride, magnesium chloride, lithium chloride, lithium bromide, ethylene glycol, propylene glycol, triethylene glycol and tetraethylene glycol. The multiple phase transformation may take place between −10 degrees C to 0 degrees C and between 1 torr and 4.58 torr. Solvent solid is melted at or near 0 degree C.; second vapor is generated in the range of 0 degrees C. to 7 degrees C.; the first vapor is absorbed in the temperature range of 0 degrees to 10 degrees C. It is noted that the vapor pressure of a solution of a given solvent and a given solute is a function of the temperature and composition. The vapor pressures of aqueous solutions of some commercial acids such as hydrogen chloride, sulfuric acid, nitric acid, of some alkalis such as sodium hydroxide are available in the International Critical Table published by McGraw Hill Company. One can estimate the vapor pressure P of a solution as a function of the absolute temperature T by knowing the freezing temperature of the solution and by applying the Clausius-Clapeyrm Equation.

Figure 6:
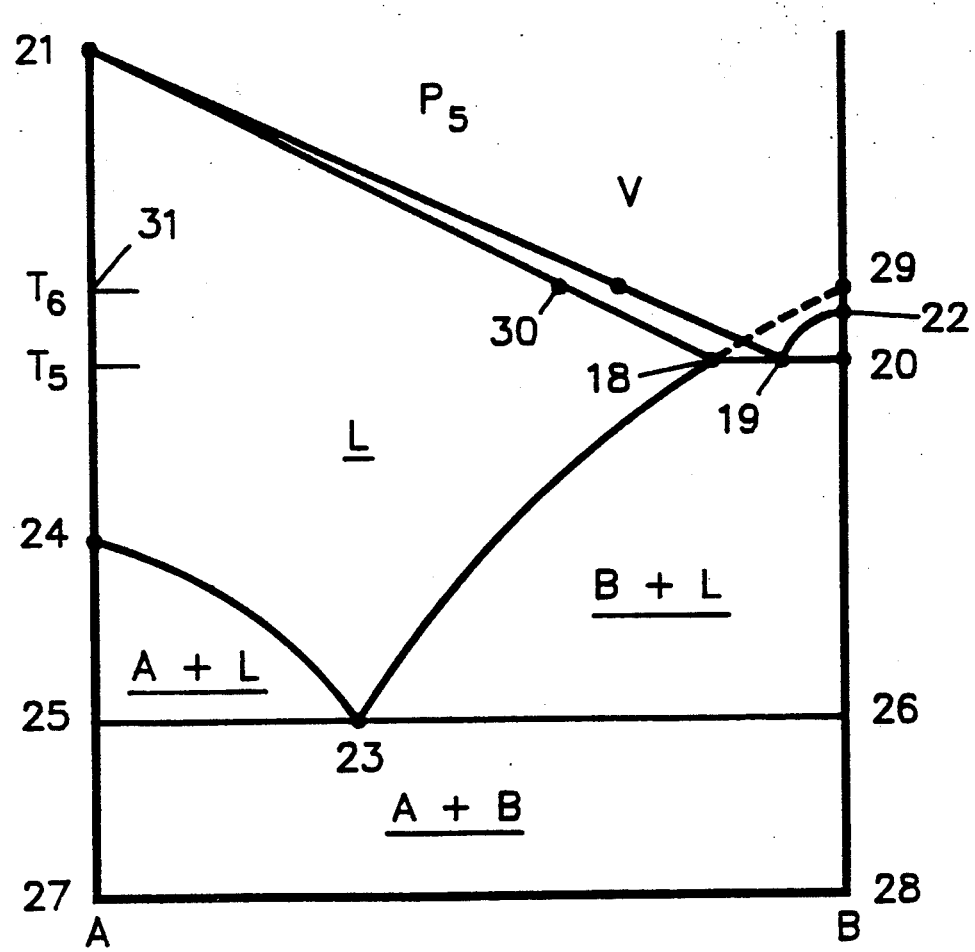
FIG. 6 illustrated a phase diagram of a binary system containing a volatile solvent and a volatile solute. This figure is also used to illustrate the operating conditions of the processing steps in both Type A and Type B MPTAM Processes for separating a mixture of volatile components.

FIG. 6 illustrates a phase diagram of a binary system of volatile components, A and B, under a pressure, $P_5$, that is lower than the triple point pressure of B-component. It is seen that there exists a three-phase temperature, $T_5$, under which a liquid phase, 18, a vapor phase, 19, and a solid phase, 20, co-exist. There are a two-phase liquid-vapor region 18-21-19, a two-phase B-solid-vapor region 19-20-22, a two-phase A-solid-liquid region 23-24-25, a two phase B-solid-liquid region 18-19-20-26-23, a two-phase A-solid-B-solid region 25-2-3-26-28-27, a single phase vapor region 21-19-22-29, and a single-phase liquid region, 21-18-23-24. The triple point temperature 29 of pure B-component is shown as $T_6$. The vapor formed in a distillative freezing operation is represented by a point near point 19. When this vapor is absorbed into an absorbing solution at an absorbing temperature such that the operating condition is represented by a point in the region 21-24-23-18-21, a single phase liquid is formed. When the absorbing condition is represented by a point within the range of 21-30-31, then the absorbing temperature is higher than the melting temperature of the purified solvent solid. Therefore, under such an operating condition, the heat released in the absorbing operation can be utilized in melting a mass of solvent solid.

A process optimization of either Type A or Type B MPTAM Process involves (1) a proper selection of the absorbing solution used and, (2), the concentration range of the solute used in the absorbing solution.

In selecting a solute to be used in formulating an absorbing solution, the following factors should be taken into consideration: (a) effectiveness in lowering the vapor pressure; (b) solubility; (c) cost; (d) corrosiveness; and (e) environmental impact. Lithium Bromide has been used extensively in absorption refrigeration in producing chilled water. It can be used in the processes because of its high solubility in water and a highly concentrated solution can indeed be used as the absorbing solution. Calcium chloride is a good solute to use because it is a neutral salt, its solubility in water is high, it is effective in lowering vapor pressure due to the fact that it dissociates into three ions, a Calcium ion and two Chloride ions, it is inexpensive, and it is not toxic. One may also use ethylene glycol, propylene glycol, triethylene glycol and tetraethylene glycol in forming absorbing solutions. These solutes are not as effective in lowering the vapor pressure of water, but they are highly soluble in water. Some disadvantages are toxicity of ethylene glycol and high viscosities of concentrated solutions.

The absorbing temperature should be higher than the melting temperature of the solvent solid by the temperature difference needed for utilizing the heat released in absorbing the first vapor into the absorbing solution for supplying the latent heat of melting the solvent solid. Therefore, the final absorbing temperature, represented by $T_{3''}$ in figure 5, is only a few degrees, say less than 5 degrees C., higher than the melting temperature of the solvent solid. The final concentration is so selected that the vapor pressure at the selected absorbing temperature is slightly lower than the pressure in the multiple phase transformation operation. In selecting the concentration difference between the enriched absorbing solution and the diluted absorbing solution, one has to consider the following factors: (a) amount of absorbing solutions to be circulated between Zone 3 and Zone 5; (b) cost of regenerating the absorbing solution; (c) cost of exchanging heat between the enriched absorbing solution and the diluted absorbing solution as they are transferred between Zone 3 and Zone 5.

Figure 7:
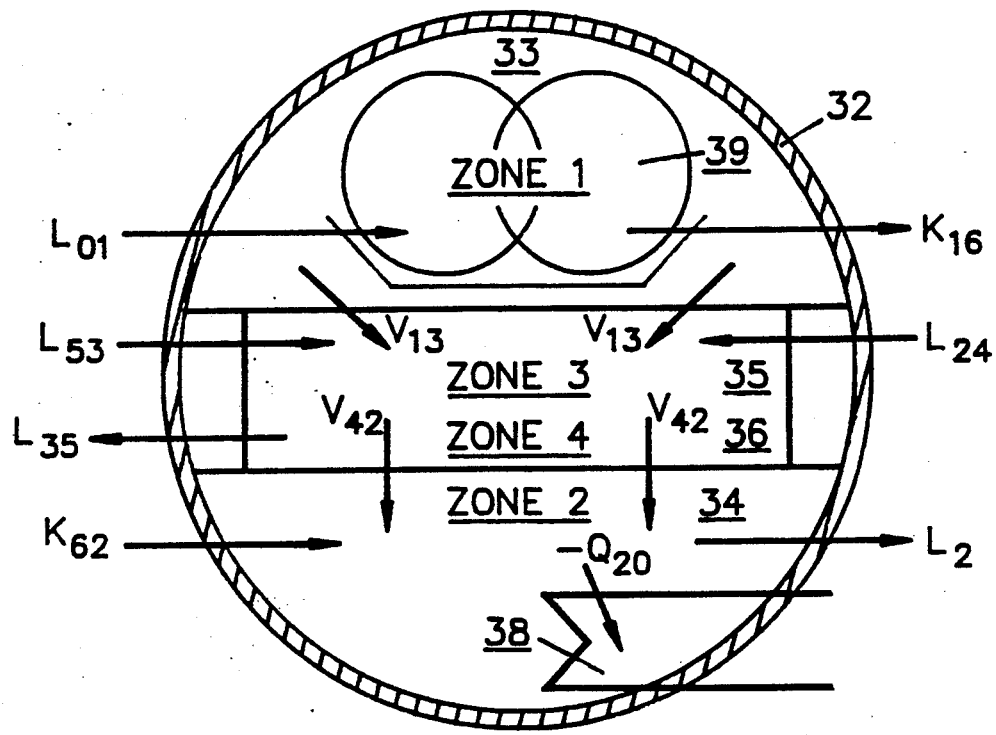
FIGS. 7 and 8 respectively illustrate a transverse cross-section and a longitudinal cross-section of an integrated single vessel unit that contains several processing zones of Type A MPTAM Process. The zones included are a multiple phase transformation zone (Zone 1), a condensation-melting zone (Zone 2), a temperature elevating first vapor absorption zone (Zone 3), and a second vapor generation zone (Zone 4).
Figure 8:
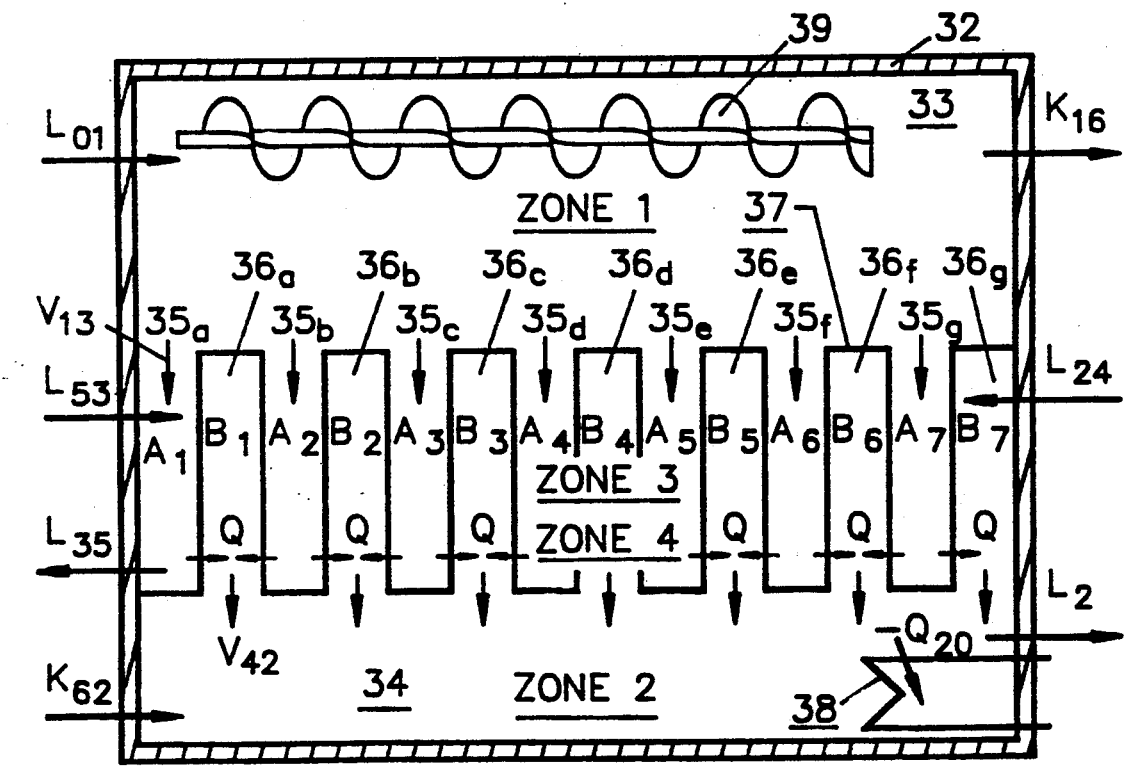

FIGS. 7 and 8 respectively illustrate a transverse cross-section and a longitudinal cross-section of an integrated unit in which Type A MPTAM Process can be conducted. In this unit, steps 1, 2, 3, and 4 can be conducted. Referring to the figures, the system has a vacuum vessel 32, and comprises a multiple phase transformation Zone 33 (Zone 1), a simultaneous condensation crystal melting Zone 34 (Zone 2), a temperature elevating first vapor absorption Zone 35 (Zone 3), and a second vapor generating Zone 36 (Zone 4). It is seen that Zone 1 and Zone 2 are respective on the top and at the bottom of the vessel and Zone 3 and Zone 4 intermesh and occupy the middle region.

In FIG. 8, Zone 3 is represented by A- compartments, A1 through A7, 35a through 35g, and Zone 4 is represented by B-compartments, B1 through B7, 36a through 26g. A heat conductive separating wall, 37, separates an A-compartment from a B-compartment. The A-compartments are in vapor communication with Zone 1, and the B-compartments are in vapor communication with Zone 2. An auxiliary cooling device 38 is used to condense the excess amount of the second vapor.

Feed $L_{01}$ is introduced into Zone 1; enriched absorbing solution $L_{53}$ is introduced into Zone 3 in such a way as to form a liquid film on the A-compartment side of each heat conductive separation wall; solvent liquid $L_{24}$ is introduced into Zone 4 in such a way to form a liquid film on the B-compartment side of each heat conductive separating wall; a solvent solid-liquid mixture, $K_{62}$, is introduced in Zone 2.

Simultaneous vaporization of solvent and formation of a mass of solvent crystals take place in Zone 1. Therefore, a first vapor, $V_{13}$, and a solvent crystal-mother liquor mixture, $K_{16}$, are formed and discharged from Zone 1. The first vapor enters A-compartments and is absorbed into the absorbing solution to form a diluted absorbing solution $L_{35}$. The heat of absorption is transmitted through the heat conductive separating wall to vaporize the solvent liquid. Therefore, a second vapor, $V_{42}$, is formed in Zone 4. The second vapor enters Zone 2 and gets in contact with the solvent solid. The vapor is condensed and, the solvent solid is melted to thereby form a mass of solvent liquid $L_2$. A fraction of the solvent liquid $L_{26}$ is used to wash crystals; a fraction of the solvent liquid $L_{24}$ is recycled to Zone 4 to be vaporized; the balance becomes product solvent $L_{2p}$.

Referring to FIGS. 7 and 8, rotating screws or rotating disks are used in conducting the multiple phase transformation operation. The uses of rotating screws or disks in conducting the multiple phase transformation operations are described in U.S. Pat. No. 4,809,519. The rotating screws or disks are partially submerged in a pool of solution. The screws or disks are wetted as they are rotated into the pool. A liquid film is formed on the surface of each screw or disk element as it is rotated out of the pool. Simultaneous vaporization and crystallization take place from the liquid film The crystals formed are dislodged from the surfaces and transported in a desired direction.]

Figure 9:
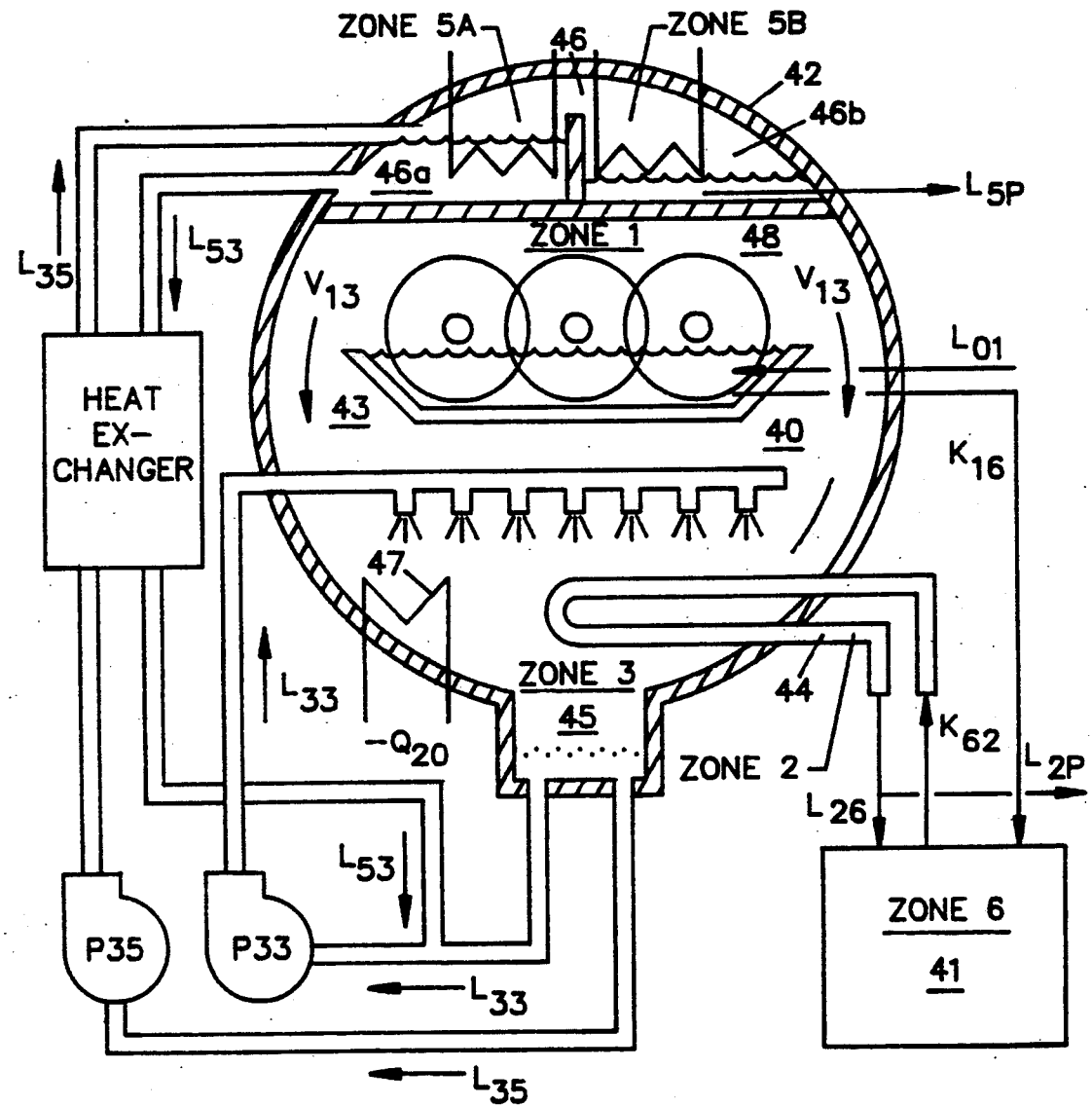
FIG. 9 illustrates a transverse cross-section of an integrated single vessel unit that contains most processing zones of a Type B MPTAM Process. The zones included are a multiple phase transformation zone (Zone 1), a crystal melting zone (Zone 2), a temperature elevating first vapor absorption zone (Zone 3), and an absorbing solution regeneration zone (Zone 5).

FIG. 9 illustrates an integrated system in which Type B MPTAM Process can be conducted. The system comprises a main unit 40, and a crystal washing unit 41. The main unit comprises a vacuum vessel, 42, that contains a multiple phase transformation Zone 43 (Zone 1), a solvent crystal melting Zone 44 (Zone 2), a temperature elevating first vapor absorption Zone 45 (Zone 3), an absorbing solution regenerating Zone 46 (Zone 5), and an auxiliary cooling unit 47. The regeneration zone is divided into an evaporation sub-zone 46a and vapor condensing sub-zone 46b. Rotating screws or disks, 48, are used to conduct the multiple phase transformation operation in Zone 1. It is noted that in Type B MPTAM system, there is no second vapor generation operation. The system used is quite similar to a system used in absorption refrigeration that is used to produce chill water manufactured by companies such as Trane Co, in Wisconsin.

In operation, feed $L_{01}$ is introduced in Zone 1, to form a first vapor, $V_{13}$, and a solid-liquid mixture, $K_{16}$. The first vapor and a recycled enriched absorbing solution, $L_{53}$, are introduced into Zone 3 and a solvent solid-liquid mixture, $K_{62}$, is introduced into Zone 2. Zone 2 is inside of heat conductive conduits that are placed within Zone 3. The first vapor is absorbed into the absorbing solution to form diluted absorbing solution $L_{35}$, and the heat released in the absorbing operation is utilized to melt the solvent crystals in Zone 2, and thereby form purified solvent $L_2$. A portion of the purified solvent is recycled to Zone 6 to wash solvent crystals; the rest becomes purified solvent product $L_{6p}$.

The need and structure of the auxiliary cooling unit 47 are similar to those described in connection with the Type A MPTAM system. The operation conducted in Zone 1 of a Type B system is also similar to that in a Type A system described. The diluted absorbing solution $L_{35}$, is subjected to a evaporation operation in Zone $5a$ using some low grade heat and the vapor so formed is condensed by cooling water in Zone $5b$.

As has been described, the key features in the processes of the present invention are (1) temperature elevation of first vapor absorption and (2) heat coupling between the first vapor absorption operation in Zone 3 and the melting operation of the solvent solid in Zone 2. Temperature elevation is defined as the difference between the absorption temperature $T_3$ in Zone 3 and the multiple phase transformation temperature $T_1$ in Zone 1. The absorption pressure $P_3$ is near or somewhat lower than the multiple phase transformation pressure $P_1$ in Zone 1. For a given solute used in formulating the absorbing solution, the concentration to be used depends on the amount of temperature elevation needed. For a given solute used, there is a limit to the degree of temperature elevation attainable. This limit may be set by the solubility limit or viscosity limit.

The degree of temperature elevation needed, $T_3-T_1$, is related to other temperatures by the following equation:

$$T_3-T_1=(T_3-T_2)+[T_2-(T_1)_{ef}]+[(T_1)_{ef}-T_1]$$

In this equation, $(T_1)_{ef}$ is the equilibrium freezing temperature of the solution processed at the final concentration. Therefore, $T_2-(T_1)_{ef}$ is the freezing point depression; $(T_1)_{ef}-T_1$ is the driving force needed in conducting the multiple phase transformation; $T_3-T_2$ is the temperature differential needed to accomplish the desired heat coupling.

For ease of conducting the first vapor absorption operation and for ease of regenerating the absorbing solution, it is desirable to use as low a concentration absorbing solution as possible. It is therefore important to reduced the degree of temperature elevation needed. Reduction of the temperature differential is needed for heat coupling, i.e. $T_3-T_2$. This value may be as high as 10 degrees centigrade. However, it is desirable to limit this value to less than 5 degrees centigrade or even less than 3 degrees centigrade.

What we claim are the following:

1. A process of subjecting a feed mixture that is at least partly in liquid state and contains a volatile solvent for a solid-liquid-vapor multiple phase transformation operation that comprises
    (1) A first step of introducing the feed mixture into a first zone (Zone 1) that is maintained under a first pressure that is lower than the vapor pressure of the mixture at its freezing temperature to thereby simultaneously vaporize the solvent and crystallize the solvent and thereby form a first vapor $V_{13}$ and a first condensed mass $K_{16}$ that contains a mass of solvent solid $S_{16}$ and
    (2) A second step of melting solvent solid in a second zone (Zone 2),
    (3) A third step of absorbing the first vapor $V_{13}$ into an absorbing solution $L_{53}$ containing the solvent and a solute in a concentration range in a third zone (Zone 3) such that while the absorption takes place under a pressure that is near or somewhat lower than the pressure prevailing in the first step, the absorbing temperature is somewhat higher than the melting temperature of the solvent solid and the heat released in the absorption step is removed from Zone 3, and
    (4) A heat transfer operation between the third zone and the second zone so that a major portion of the heat released in the third step is used in supplying the heat needed in the second step.

2. A process of claim 1, wherein the absorption temperature is higher than the melting temperature of the solvent solid by less than ten degrees centigrade.

3. A process of claim 1, wherein the absorbing temperature is higher than the melting temperature of the solvent solid by less than five degrees centigrade.

4. A process of claim 1, which is further characterized in that the second zone and the third zone are separated by a heat conductive wall so that the heat released in Step 3 is transmitted through the separating wall to supply the heat needed in Step 2.

5. A process of claim 4, wherein the second zone is located within one or more conduits and the walls of the conduits are the heat conduitive wall separating the second zone and the third zone.

6. A process of one of claim 1, which further comprises:
    (5) A fourth step of generating a second vapor from a mass of solvent liquid in a fourth zone, the fourth zone being separated from Zone 3 by one or more heat conductive separating walls, so that the heat released in Step 3 is transmitted through the wall to supply the heat needed in Step 4, and the process is further characterized in establishing heat interaction between the second vapor generated and the solvent solid in Zone 2 so that the heat needed in Step 2 is supplied by condensing the second vapor.

7. A process of claim 6, wherein the heat interaction between the second vapor and the solvent solid is accomplished by bringing the second vapor in contact with the solvent solid.

8. An apparatus for subjecting a feed mixture containing a volatile and crystallizable solvent to a solid-liquid-vapor multiple phase transformation separation that comprises:
    (1) A vessel that contains three processing zones, respectively denoted as Zone 1, Zone 2, and Zone 3, and a separation zone separating Zone 2 and Zone 3, denoted as Zone 23, arranged in a sequence of Zone 1, Zone 3, Zone 23, and Zone 2 within the vessel,
    (2) A first vapor passage between Zone 1 and Zone 3,
    (3) A first vapor flow barrier preventing flow of vapor between Zone 3 and Zone 2,
    (4) A first interface providing means for providing a substantial liquid-vapor interaction surface in Zone 1,
    (5) A second interface providing means for providing a substantial liquid-vapor interaction surface in the separation Zone,
    (6) A first heat tranfer means for transferring heat from Zone 3 to Zone 2,
the apparatus upon
    (1) evacuating the vessel, (2) introducing a feed mixture $L_{01}$ into Zone 1,
(3) introducing an absorbing solution $L_{53}$ into Zone 3,
(4) introducing a mass of solvent solid into Zone 2, causing the following transformations:
  (1) the feed mixture in Zone undergoes simultaneous vaporization and solidification operations to form a first vapor $V_{13}$ and a solid-liquid mixture $K_{16}$ containing a mass of solvent solid $S_{16}$,
  (2) the first vapor $V_{13}$ enters Zone 3 and is absorbed into the absorbing solution $L_{53}$ to form a diluted absorbing solution $L_{35}$,
  (3) the heat released in the absorption operation in Zone 3 is transmitted through the first heat transfer means into Zone 2,
  (4) the solvent solid $S_{62}$ in the solid-liquid mixture $K_{62}$ in Zone 2 undergoes a melting operation upon receiving heat from the first heat transfer means.

9. An apparatus of claim 8, wherein both the first vapor flow barrier and the first heat transfer means are a set of heat conductive walls of the first set of fluid conduits, and Zone 2 is inside of the set of fluid conduits, and the second interface providing means to form a liquid film of absorbing solution is on the outer surfaces of the first set of fluid conduits.

10. An apparatus of claim 8, wherein the first interface providing means is a set of rotating vertical or near vertical surfaces.

11. An apparatus of claim 10, wherein the first interface providing means is a set of rotating screws or a set of rotating disks.

12. An apparatus of claim 8 which further comprises:
  (7) a fourth processing zone, denoted as Zone 4, in the separating zone,
  (8) a second interface providing means for providing a substantial liquid-vapor interaction surface in Zone 3,
  (9) a third interface providing means for providing a substantial liquid-vapor interaction Zone 4,
wherein both the first vapor flow barrier and the first heat transfer means are a set of heat conduction vertical walls, the second interface providing means is provided by forming a liquid film on a first side of the set of vertical walls and the third interface providing means is provided by forming liquid film on the other side of the set of vertical walls, the apparatus upon
  (1) evacuating of the vessel,
  (2) introducing a mass of solvent solid in Zone 2,
  (3) introducing absorbing solution in Zone 3, and
  (4) introducing a mass of solvent liquid in Zone 4
causing the following transformations
  (1) the feed mixture in Zone 1 undergoes simultaneous vaporization and solidification operations to form a first vapor $V_{13}$ and a solid-liquid mixture $K_{16}$ containing a mass of solvent solid $S_{16}$,
  (2) the first vapor $V_{13}$ enters Zone 3 and is absorbed into the absorbing solution $L_{53}$ to form a diluted absorbing solution $L_{35}$,
  (3) the heat released in the absorbing operation in Zone 3 is transmitted through the heat conduction wall to Zone 4,
  (4) the mass of solvent liquid $L_{24}$ is vaporized to form a second vapor $V_{42}$,
  (5) the second vapor heat exchange with the solvent solid in Zone 2 to thereby undergo simultaneous condensation of second vapor and melting of the solvent solid to thereby form a mass of solvent liquid $L_2$.

13. An apparatus of claim 12 which comprises a first set of compartments in Zone 3, respectively and sequentially denoted as $A_1$, $A_2$, $A_{(N-1)}$ and $A_N$, $A_N$ being the highest number compartment in the first set, and a second set of compartments in Zone 4, respectively and sequentially denoted as $B_1$, $B_2$, $B_{(M-1)}$ and $B_M$, $B_M$ being the highest number compartment in the second set, the two sets of compartments forming an intermeshing array of compartments, a heat conductive wall separating a compartment in the first set from two neighboring compartments in the second set.

* * * * *